United States Patent Office.

STEPHEN BOURNE, OF HEADSTONE DRIVE HARROW, ENGLAND, ASSIGNOR TO HIMSELF AND THEODORE BOURNE, OF NEW YORK CITY.

Letters Patent No. 61,992, dated February 12, 1867.

IMPROVED MODE OF TREATING INDIA RUBBER.

*The Schedule referred to in these Letters Patent and making part of the same.*

TO ALL WHOM IT MAY CONCERN:

Be it known that I, STEPHEN BOURNE, of Headstone Drive Harrow, county of Middlesex, England, have invented a new and useful Improved Mode of Treating India Rubber; and I do hereby declare that the following is a full, clear, and exact description thereof, which will enable others skilled in the art to make and use the same.

The object of this invention is to deprive India rubber, and the goods or articles into the composition of which it enters, of the odor attaching to India rubber itself, and the various solvents or other substance or substances with which it is combined. And for this purpose the invention consists in exposing the India rubber, or its various compounds, to contact with charcoal, and heating them together to such an extent as the different descriptions of goods may bear without injury; charcoal, especially animal, having the power of absorbing the offensive smell or odor usually pertaining to this material, as well, also, as its ability to impart flavor to liquids and other substances with which it may come in contact. The charcoal may be used either coarsely powdered, or granulated, or reduced to a fine powder, and though animal charcoal is preferable, yet for some purposes that made from wood may be advantageously employed. A convenient form of vessel to be used for this purpose is a box or chamber, of metal or other suitable material, having double sides and bottom forming a receptacle for water or air to be heated to the proper degree. Within this vessel the articles to be operated upon are placed, with a thin layer of charcoal underneath and over them, so that the two may be in close contact, and where the articles are of such a nature as not to be injured by it, the vessel may be filled with successive alternate layers of India rubber and charcoal. But for many articles it is desirable to have a succession of shelves or trays on each of which one or more articles may be placed with charcoal above and underneath; and where it is desirable to retain a high degree of polish the articles may be laid face downwards on a surface of polished metal and covered with the charcoal, which will draw the odor through the back surface of the article. In this state, the surrounding water or air is to be heated to such a degree as the articles may bear without injury, and the heat continued for such a length of time as may be necessary, both the heat and the time being varied according to the nature of the goods. In ordinary articles, (or the material from which they are made,) such as garments, &c., either of single or double texture, vulcanized or otherwise, a heat of from 140° to 180° Fahrenheit for a space of three or four hours may be enough, but for thicker substances, fully vulcanized, the heat may be advantageously raised to over that of boiling water, and continued for twelve or twenty-four hours, or even longer. When the substance to be so treated is very thin or delicate in texture or appearance, the surface may be protected by thin blotting paper, cloth, or other material, and even gauze or wire netting placed between it and the charcoal. For those goods which will bear subsequent washing either with water, soap and water, or alkaline solutions, the charcoal in fine powder may be used, but for those which cannot thus be treated the granulated or coarse powder is most serviceable; and when this is used, it may readily be shaken from the article or removed by brushing or other mechanical means, in which manner, also, the fine powder may often with advantage be removed. Should any roughness or indentations of the surface remain, they may be removed by rapidly passing the articles over a moderately heated iron or other surface, or by exposure to a moderate heat for a sufficient time. When cut-sheet or some other forms of unvulcanized rubber and rubber prepared for vulcanization, but not yet subjected to the curing heat, are thus treated, the charcoal will sometimes adhere so firmly to the surface as to become incorporated with the rubber, and this compound article, having many useful properties, forms a part of this invention.

I claim as new, and desire to secure by Letters Patent—

Deodorizing India rubber, or any compound of which it forms a part, by means of charcoal, substantially as described.

The above specification of my invention signed by me this 29th day of September, 1866.

STE. BOURNE.

Witnesses:
G. F. WARREN, No. 17 Gracechurch Street, London, E. C.
W. W. WYNN, 24 Royal Exchange, London.